(12) United States Patent
Zhang

(10) Patent No.: US 10,617,487 B2
(45) Date of Patent: Apr. 14, 2020

(54) ZERO-SUCKBACK DEVICE FOR DISPOSABLE HIGH-SPEED TURBINE DENTAL DRILL HANDPIECE

(71) Applicant: Beijing Dongbo Dental Handpiece Co., Ltd., Beijing (CN)

(72) Inventor: Fudong Zhang, Beijing (CN)

(73) Assignee: Beijing Dongbo Dental Handpiece Co., Ltd., Beijing (CN)

( * ) Notice: Subject to any disclaimer, the term of this patent is extended or adjusted under 35 U.S.C. 154(b) by 0 days.

(21) Appl. No.: 15/644,175

(22) Filed: Jul. 7, 2017

(65) Prior Publication Data

US 2017/0340412 A1    Nov. 30, 2017

Related U.S. Application Data

(63) Continuation of application No. PCT/CN2016/091512, filed on Jul. 25, 2016.

(30) Foreign Application Priority Data

May 30, 2016  (CN) .......................... 2016 1 0370889

(51) Int. Cl.
| | |
|---|---|
| *A61C 1/05* | (2006.01) |
| *A61C 3/02* | (2006.01) |
| *A61C 1/12* | (2006.01) |

(52) U.S. Cl.
CPC ............. *A61C 1/057* (2013.01); *A61C 1/12* (2013.01); *A61C 3/02* (2013.01)

(58) Field of Classification Search
CPC ........ A61C 1/057; A61C 3/02; A61C 1/10–16
(Continued)

(56) References Cited

U.S. PATENT DOCUMENTS

| 5,334,013 A | 8/1994 | Meller | |
|---|---|---|---|
| 5,538,425 A * | 7/1996 | Reeves | ..................... A61C 1/05 |
| | | | 433/126 |

(Continued)

FOREIGN PATENT DOCUMENTS

| CN | 1887237 A | * | 1/2007 | ............... A61C 1/05 |
|---|---|---|---|---|
| CN | 1887237 A | * | 1/2007 | ............... A61C 1/05 |

(Continued)

OTHER PUBLICATIONS

International Search Report for Chinese Application No. 201610370889 dated Sep. 1, 2016.

(Continued)

*Primary Examiner* — Matthew M Nelson
(74) *Attorney, Agent, or Firm* — Jenkins, Wilson, Taylor & Hunt, P.A.

(57) ABSTRACT

A zero-suckback device for a disposable high-speed turbine dental drill handpiece includes two units respectively installed at two ends of the head of the handpiece. On one side of the handpiece head where a drill pin is installed, one unit consists of an elastic shaft sealing casing which is centrally embedded with a central framework made of hard substances and a non-elastic shaft sealing casing, and a lip portion of the elastic shaft sealing casing fits a wind wheel shaft with a tapered end. On the cover side of the handpiece head and between a button housing and a head housing, an O-shaped sealing ring is installed, and a one-way ball valve is installed at the center of the button housing. Suckback prevention measures are adopted at both sides of the handpiece head, so matters sucked back can be controlled to be a very low level, nearly zero.

14 Claims, 6 Drawing Sheets

(58) Field of Classification Search
USPC .................................................. 433/114–133
See application file for complete search history.

(56) References Cited

U.S. PATENT DOCUMENTS

| | | | |
|---|---|---|---|
| 6,186,678 B1 | 2/2001 | Kato et al. | |
| 7,625,209 B2* | 12/2009 | Wade | A61C 1/16 |
| | | | 408/56 |
| 8,092,217 B2 | 1/2012 | Zhang | |
| 2004/0166474 A1* | 8/2004 | Gugel | A61C 3/025 |
| | | | 433/126 |
| 2007/0172791 A1 | 7/2007 | Novak et al. | |
| 2009/0004623 A1* | 1/2009 | Zhang | A61C 1/05 |
| | | | 433/132 |
| 2009/0075233 A1* | 3/2009 | Zhang | A61C 1/05 |
| | | | 433/132 |
| 2014/0038123 A1* | 2/2014 | Zhang | A61C 1/057 |
| | | | 433/29 |
| 2015/0196375 A1* | 7/2015 | Wegmann | A61C 17/043 |
| | | | 433/92 |

FOREIGN PATENT DOCUMENTS

| | | | |
|---|---|---|---|
| CN | 1887237 A | | 1/2007 |
| CN | 201676024 U | | 12/2010 |
| CN | 102379746 A | * | 3/2012 |
| CN | 102379746 A | | 3/2012 |
| CN | 202154756 U | | 3/2012 |
| CN | 102836011 A | | 12/2012 |
| CN | 202612069 U | | 12/2012 |
| CN | 103462703 A | | 12/2013 |
| CN | 204890564 U | | 12/2015 |
| CN | 204931863 U | | 1/2016 |
| CN | 105476722 A | | 4/2016 |

OTHER PUBLICATIONS

Chinese Office Action and First Search for Chinese Application No. 201610370889.1 dated Nov. 1, 2016.
International Preliminary Report on Patentability and Written Opinion for Application No. PCT/CN2016/091512 dated Dec. 4, 2018.

\* cited by examiner

ZERO-SUCKBACK DEVICE FOR DISPOSABLE HIGH-SPEED TURBINE DENTAL DRILL HANDPIECE

CROSS-REFERENCE TO RELATED APPLICATIONS

This patent application is a continuation of International Application No. PCT/CN2016/091512 filed Jul. 25, 2016 which claims priority to Chinese Patent Application No. 201610370889.1 filed May 30, 2016, the entire disclosures of which are incorporated by reference herein.

TECHNICAL FIELD

The disclosure herein relates to a medical device, in particular a dental hand-held instrument for drilling teeth.

BACKGROUND

An existing high-speed turbine dental drill handpiece includes a handpiece head, a head cover, a drill pin, a front handle and a rear handle. See FIG. 1. The rear handle is connected to a quick-plug connector of a dental therapeutic machine for obtaining compressed air, pressurized cooling water, etc. required by the handpiece for working. The front handle is a portion held by a doctor. The handpiece head is internally equipped with a wind wheel which can be driven by compressed air. The wind wheel is supported by two bearings at the middle of the wind wheel shaft and is damped with two O-shaped rubber rings.

At present, such dental drill handpiece can generate a suckback phenomenon which may result in iatrogenic cross infection. The causes are below:

1) Generation of Contamination Sources

When using a high-speed turbine dental drill to drill teeth, a doctor must place the high-speed turbine dental drill in the oral cavity of a patient, and water is sprayed to cool the drill pin during the drilling, so the handpiece head and a part of the front handle of such handpiece inevitably touch the teeth, oral mucosa, dental pulp cavity, etc. of the patient, and sometimes the blood, and the cooling water sprayed to the drill pin during the treatment and the saliva of the patient generate contaminating liquid in the oval cavity of the patient. If the treated patient has some transmitted diseases, such as hepatitis B, Hepatitis C and AIDS, then such contaminating liquid inevitably contains a huge amount of harmful viruses and bacteria.

2) Iatrogenic Cross Infection Caused by Suckback

The existing high-speed dental drill handpiece generates the suckback phenomenon when drilling teeth, which is known in the field.

As shown in FIG. 2 and FIG. 3, when the compressed air enters the handpiece head via the air inlet and blows the wind wheel to rotate, the wind wheel chamber is in a positive pressure state. In such circumstances, suckback is not generated. When a doctor is going to stop the handpiece from rotating, the compressed air flow disappears via the air inlet of the head 1, and the wind wheel continues to rotate for a period of time by inertia. Due to no supply of the compressed air in the air inlet, the rotating wind wheel sucks air from seams at the upper and lower ends of the head and exhausts the air into the air inlet and the exhaust opening. In such circumstances, at this place, the handpiece head easily sucks the above mentioned oral contaminating liquid or atomized contaminating liquid drops suspended in the oral cavity or fine particles ground off from the teeth into the wind wheel cavity thereof and exhausts the sucked substances into the exhaust opening, thus contaminating components (such as the wind wheel, bearing, etc.) in the cavity of the head and the air exhaust tube, and even transmitting the sucked substances into the pipelines and related components of the therapeutic machine. When the doctor treats the next patient, such contaminants adhered to the interior of the cavity of the handpiece head of the turbine dental drill handpiece and to the pipes and components of the therapeutic machine are sprayed into the oral cavity of the next patient along with the compressed air, thus generating iatrogenic cross infection.

In the prior art, the technical material with the proximate technical characteristic is patent ZL20061020074.X which is entitled "Suckback Prevention Device for Disposable High-Speed Turbine Dental Drill Handpiece". FIG. 4 is a drawing of the patent in 2006.

The prior art mostly focuses on the suckback prevention device disposed on one side of the handpiece where the drill pin is installed and effective prevention of the negative pressure suckback phenomenon generated due to the inertia rotation of the wind wheel after the supply of the compressed air is stopped. Even in a water immersion test, no substance is sucked when one side of the handpiece is immersed in water (the side of the head equipped with the drill pin is immersed in water after rotating; after the handpiece stops rotating in water, take out the handpiece and weight it, wherein the difference of the weight before and after the water immersion is the suckback quantity). See FIG. 5 and FIG. 9. However, considerable sucked substances flow into the turbine cavity in the fully immersed state (the whole handpiece head is immersed in water). See FIG. 5 and FIG. 10.

For the existing patent ZL20061020074.X, the elastic shaft sealing casing thereof can complete sealing and braking at the moment when the air supply to the wind wheel is stopped. Due to the sealing effect, the handpiece immersed in the water can prevent water (contaminants) from being sucked into the wind wheel chamber. Therefore, no water can enter the turbine cavity and no substance is sucked back. However, it should be noted that the wind wheel cavity is still in the negative pressure state in such moment and needs to be supplemented with the external air to keep balance with the atmospheric pressure. Therefore, a relatively large clearance exists between the button housing and the head housing on one side of the head cover. Naturally, the air is supplemented via the clearance to keep balance with the external atmospheric pressure. In such circumstances, if the handpiece head is completely immersed in water, water enters the turbine cavity via the clearance between the head housing and the button housing by the negative pressure effect of the wind wheel chamber, resulting in iatrogenic cross infection.

The above water immersion test represents that the patent ZL20061020074.X and other suckback prevention devices disposed only on one side have the suckback prevention function and can even achieve zero-suckback in the one-side water immersion test, but fail to stop the suckback when the handpiece head is fully immersed in water; in the full water immersion test, the sucked substances enter the wind wheel chamber from the other side, so the suckback phenomenon still exists and the iatrogenic cross infection may exist. See FIG. 5 and FIG. 6.

Experiments show that the handpiece which achieves the zero suckback when immersed in the water on one side (the side where the handpiece head is equipped with the drill pin)

still sucks dozens or hundreds of milligrams of substances in the full water immersion test.

SUMMARY

An objective of the disclosure herein is to provide a zero-suckback device for a disposable high-speed turbine dental drill handpiece, which is installed on two sides of the handpiece head (one side with a drill pin and one side with a head cover).

The subject matter herein discloses a zero-suckback device for a disposable high-speed turbine dental drill handpiece, jointly comprising or consisting of a suckback prevention device installed on one side of the dental drill handpiece where the handpiece head is equipped with a drill pin and a suckback prevention device of the dental drill handpiece where the handpiece head is equipped with a head cover, wherein the dental drill handpiece comprises or consists of a handpiece head, a drill pin, a head cover, a front handle and a rear handle, the head cover includes a head housing, a button housing, etc.; a power wind wheel and a wind wheel shaft which drive the drill pin to rotate are disposed in a space formed by fastening the head and the head cover; the wind wheel shaft is supported by two bearings; O-shaped rubber damping rings are disposed between the bearings and the handpiece head; the wind wheel shaft is provided with the head cover at the upper end; the neck of the handpiece head is provided with a water duct, an air intake passage and an air exhaust passage; an opening of the air intake passage is positioned at the power wind wheel; the suckback prevention device on the side where the head cover is equipped consists of a head housing and a button housing, an annular clamping slot is disposed between the head housing and the button housing and positioned on the inner side of the head housing; the clamping slot is internally embedded with an O-shaped sealing ring; the button housing is provided with a one-way air exhaust mechanism;

wherein the wind wheel shaft disposed in the head has one end connected to the drill pin while the end is a conical brake face, the lower end of the wind wheel shaft is retractably disposed in the handpiece head; wherein the handpiece head is equipped with an elastic shaft sealing casing and a non-elastic shaft sealing casing on an end face connected to one side of the drill pin, the elastic shaft sealing casing is centrally formed with a drill pin hole with a size which is a little greater than the size of the outer diameter of the drill pin, the outer edge of the elastic shaft sealing casing is in connected with the outer edge of the head through screw threads, the non-elastic shift sealing cover is centrally formed with a drill pin hole with a size which is a little greater than the size of the outer diameter of the drill pin;

wherein the thickness of the elastic shaft sealing casing close to the central portion is greater than the thickness of a ring-shaped portion between the central portion and the edge of the elastic shaft sealing casing, the inner surface of the central portion of the elastic shaft sealing casing is a tapered face matched with the brake surface of the wind wheel shaft; and wherein the elastic shaft sealing casing is disposed in the non-elastic shaft sealing casing, and the shape of the inner wall of the non-elastic shaft sealing casing is matched with the exterior shaft of the elastic shaft sealing casing in the inflated state.

A suckback prevention device with an elastic shaft sealing casing is installed on one side of the handpiece head with the drill pin. The lip portion (namely the center of the elastic shaft sealing casing close to the edge of the drill pin) presses against the tapered face of the wind wheel shaft by the joint effect of the elastic resetting of the elastic shaft sealing casing and the negative pressure in the turbine cavity when the turbine stops air supply, and then the wind wheel brakes and seals up the tapered face of the wind wheel shaft, so the sucked substances cannot flow into the wind wheel chamber. On the other side (namely the side with the head cover) of the handpiece head, in the present disclosure, an O-shaped sealing ring is installed between the head housing and the button housing; the O-shaped ring seals up an annular seam formed between the button housing and head housing, so no matter the wind wheel chamber forms the positive pressure or negative pressure inside, air cannot escape or be sucked via the seam. Therefore, when the wind wheel rotates by inertia after the air supply is stopped, the negative pressure generated in the wind wheel chamber does not suck substance from the seam.

The button housing is equipped with a one-way air exhaust mechanism, preferably a one-way ball valve, in the center. When the wind wheel works normally, the wind wheel chamber is in the positive pressure state and the axial component of the airflow which drives the wind wheel to rotate escapes via the one-way ball valve in the center of the button housing. In such circumstances, the valve ball in the ball valve is raised by the air pressure. The airflow escapes via the vents on the button housing and therefore does not affect the normal running of the wind wheel. See FIG. 8. When the wind wheel rotates by inertia after the air supply is stopped, the wind wheel chamber generates a negative pressure, and then the valve ball resets automatically by the negative pressure effect to seal up the exhaust opening of the valve and prevent the entry of the sucked substances.

The technical solution of the disclosure herein is as follows:

1. The handpiece head is equipped with an elastic shaft sealing casing on one side with a drill pin; the central lip portion of the elastic shaft sealing casing is conical and fits the taped face of the wind wheel brake; and the elastic shaft sealing casing is externally equipped with a non-elastic shaft sealing casing and is connected with the head cover through screw threads.

2. On one side of the handpiece head equipped with the buttoned-head housing, a one-way valve with a valve ball is installed in the center of the button housing, and the one-way valve exhausts an airflow in positive pressure to cool bearings when the wind wheel rotates normally; when the wind wheel rotates by inertia after the air supply is stopped, the wind wheel chamber generates a negative pressure, and the valve ball seals up the exhaust opening of the one-way valve, thus preventing the sucked substances from entering the wind wheel chamber.

3. On one side of the handpiece head equipped with the button housing, an O-shaped sealing ring is installed between the button housing and the head housing, thus sealing up the clearance between the button housing and the head housing and preventing the sucked substances from entering the wind wheel chamber via the clearance. The O-shaped ring is in sliding fit, so the operation of installing and removing the drill pin on the button housing.

The present disclosure has, for example, at least the following beneficial effects or advantages:
  1. The suckback prevention devices are installed on both sides of the handpiece head (on the side where the drill pin is installed and on the side where the head cover is installed), so the suckback is effectively generated. No matter the negative pressure test which is carried out at the moment when the handpiece stops running or the full water immersion test of the handpiece (see FIG. 10), the sucking quantity is very tinny, and zero-suckback effect can be achieved, thus effectively avoiding the iatrogenic cross infection.

2. The installation of the devices does not affect the normal running of the wind wheel and the installation and removal of the drill pin on the button housing.

3. The disclosure herein achieves the zero-suckback purpose, is low in price, easily installed and commissioned, is conveniently produced in a massive scale, and particularly suitable for disposable handpiece.

The zero-suckback design is never seen on the current dental drill handpiece market. Relative to the prior art in which the currently available dental drill handpieces have the suckback prevention device only on the side where the drill pin is installed, the disclosure herein possesses outstanding features and remarkable progresses.

The working principle of the disclosure herein is as follows:

When the drill pin is working, namely when the power wind wheel is blown by the compressed air to rotate, the airflow generated by the axial component of the airflow which drives the wind wheel escapes via the seam between the tapered end face of the wind wheel shaft and the tapered lip portion of the elastic shaft sealing casing and blows up the elastic shaft sealing casing to separate the wind wheel shaft from the elastic shaft sealing casing; meanwhile, on the other side of the wind wheel shaft (namely on the side of the head cover), the valve ball in the spherical one-way valve in the center is raised by the airflow in the positive pressure and exhausts an airflow via four vent holes on the button housing. In such circumstances, the wind wheel shaft and the drill pin can rotate normally, drilling and cutting down teeth.

When the doctor stops drilling or cutting, the airflow which drives the wind wheel disappears, and then the wind wheel continues to rotate by inertia and generates a negative pressure in the wind wheel chamber. In such circumstances, 1) the lip portion of the elastic shaft sealing casing installed on one side of the handpiece head equipped with the drill pin presses against the tapered end face of the wind wheel shaft by the joint effect of the elasticity of the elastic shaft sealing casing and the negative pressure in the wind wheel chamber, thus preventing contaminants from entering the wind wheel chamber here.

2) on the side of the head cover equipped with the head cover, the valve ball in the one-way ball valve in the center resets to the exhaust opening of the valve by the negative pressure effect of the wind wheel chamber to seal up the passage between the wind wheel chamber and the outside world. Namely, the O-shaped sealing ring between the button housing and the head housing seals up the clearance there-between, so no sucked substance enters the wind wheel chamber on this side.

3) After the zero-suckback device of the disclosure herein is installed, the doctor's operation of cutting the teeth or replacing, installing and removing the drill pin is not affected.

The one-way valve with the valve ball installed in the center of the button housing plays the following roles.

a) Exhaust the airflow for cooling the bearings when the wind wheel shafts is rotates.

b) When the supply of the compressed air to the wind wheel is stopped, the valve ball seals up the exhaust opening to prevent the sucked substances from entering the wind wheel chamber.

The disclosure herein also provides a zero-suckback device for a high-speed turbine dental drill handpiece, wherein the handpiece head and the head cover are both made of rubber plastic or metal materials.

The disclosure herein also provides a zero-suckback device for a high-speed turbine dental drill handpiece, wherein the elastic shaft sealing casing is made of rubber or rubber plastics.

The disclosure herein also provides a zero-suckback device for a high-speed turbine dental drill handpiece, wherein the non-elastic shaft sealing casing is made of metal or hard plastic materials.

The disclosure herein also provides a zero-suckback device for a high-speed turbine dental drill handpiece, wherein the one-way air exhaust mechanism is a one-way ball valve, comprising vent holes which are formed in the center of the button housing and a valve body which is disposed on the button housing, positioned in the dental drill handpiece and corresponds to the vent hole; the valve body contains a valve ball inside; an exhaust opening is formed at the lower end of the valve body and communicates with the interior of the dental drill handpiece. The quantity of the vent holes is greater than 1, preferably 2-8, more preferably 4. The quantity and size of the vent holes are related to the designed air exhausting area of the wind wheel.

The disclosure herein also provides a zero-suckback device for a high-speed turbine dental drill handpiece, wherein the valve body is a metal or rubber plastic product.

The disclosure herein also provides a zero-suckback device for a high-speed turbine dental drill handpiece, wherein the valve ball is a metal or rubber plastic product.

The disclosure herein also provides a zero-suckback device for a high-speed turbine dental drill handpiece, wherein on one side of the non-elastic shaft sealing casing, the elastic shaft sealing casing is centrally provided with a hard central framework, and the hard central framework is made of metal, hard rubber plastic or hard plastic materials, and preferably, the hard central framework is a metal ring.

Due to the inflexibility and relatively high inner hole accuracy, the hard central framework in the center of the elastic shaft sealing casing can overcome the defect that the arc-shaped deformation of the elastic shaft sealing casing after the casing is blown up reduces the flowing area of the airflow, thus reducing the rotation speed and the output power losses.

The disclosure herein also provides a zero-suckback device for a high-speed turbine dental drill handpiece, wherein the outer diameter of the hard central framework is smaller or a little smaller than that of the central portion of the elastic shaft sealing casing, and the size of the inner diameter is greater or a little greater than the size of the outer diameter of the drill pin.

In the disclosure herein, "a little" means "slightly".

The disclosure herein also provides applications of the zero-suckback device for the high-speed turbine dental drill handpiece at the disposable turbine dental drill handpiece.

BRIEF DESCRIPTION OF THE DRAWINGS

FIG. 7b is an amplified view of position A in FIG. 7a (the wind wheel chamber is in the positive pressure state, the handpiece head exhausts air from the two ends without suckback);

FIG. 8a is an overall state diagram; FIG. 8b is an amplified view of the head housing; FIG. 8c is a top view of the button housing; FIG. 8d is an amplified view of vent holes of the button housing; FIG. 8e is a state diagram of the suckback prevention of the ball valve;

REFERENCE LABELS

1-Handpiece head; 2-head cover; 3-drill pin; 4-front handle; 5-rear handle; 6-non-elastic shaft sealing casing; 7-elastic shaft sealing casing; 8-hard central framework; 9-tapered end face of the wind wheel shaft; 10-bearing; 11-O-shaped rubber damping ring; 12-wind wheel; 13-wind wheel chamber; 14-O-shaped sealing ring; 15-button housing; 16-valve exhaust opening; 17-vent hole; 18-valve ball; 19-valve body; 20-wind wheel shaft

DETAILED DESCRIPTION

Embodiment 1

Figure 1:
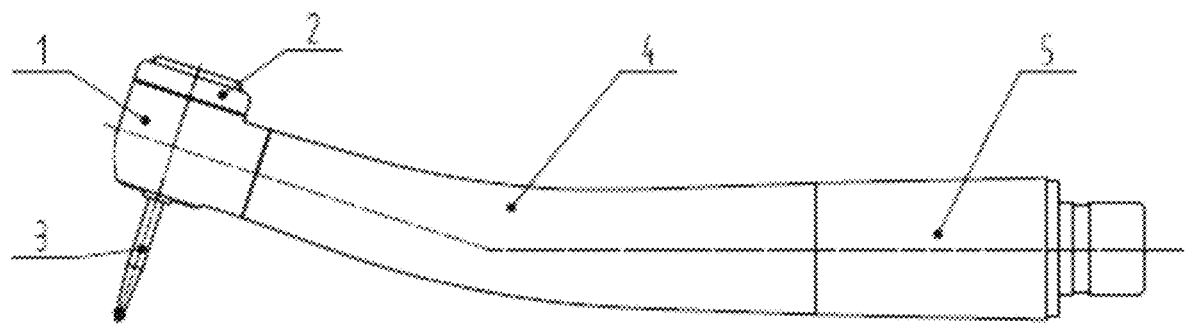
FIG. 1 is a structural view of a high-speed turbine dental drill handpiece.
Figure 2:
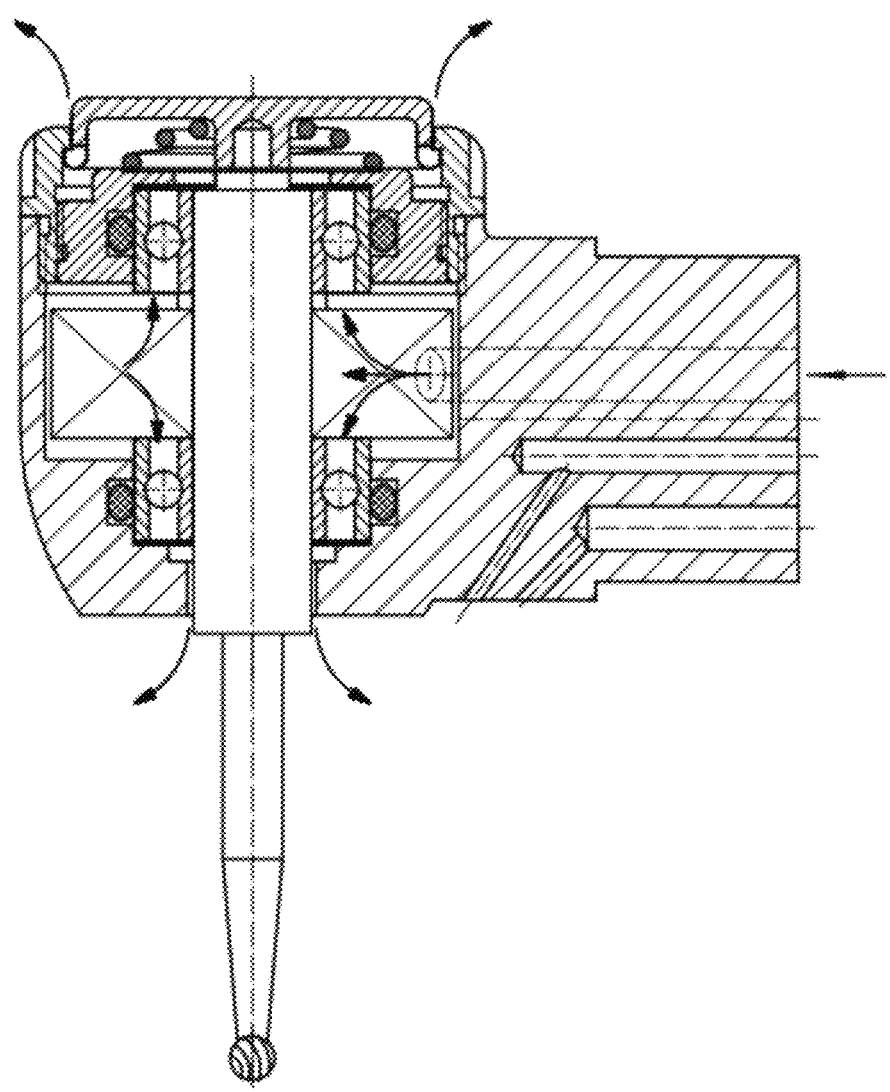
FIG. 2 is an assembling drawing of the head of the handpiece in the prior art in the working state (when the wind wheel chamber is in the positive pressure state, the two ends of the head exhausts air at two ends without suckback)
Figure 3:
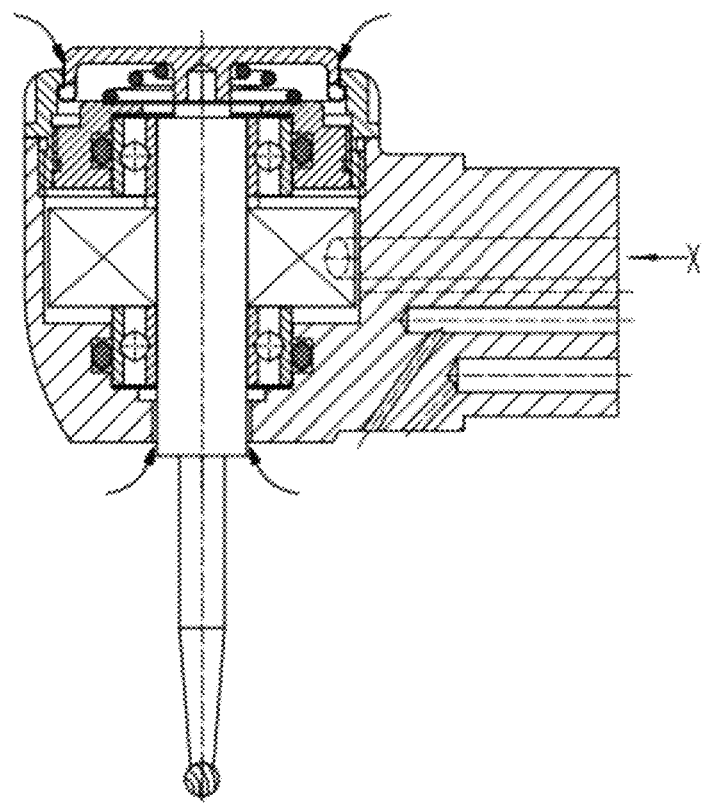
FIG. 3 is an assembling drawing of the head of the handpiece in the prior in the state when the wind wheel rotates by inertia after the air supply is stopped and generates a negative pressure (when the wind wheel chamber is in the negative pressure state, the two ends of the head supplies airflow to the wind wheel chamber, generating the phenomenon of sucking the contaminants back)
Figure 4:
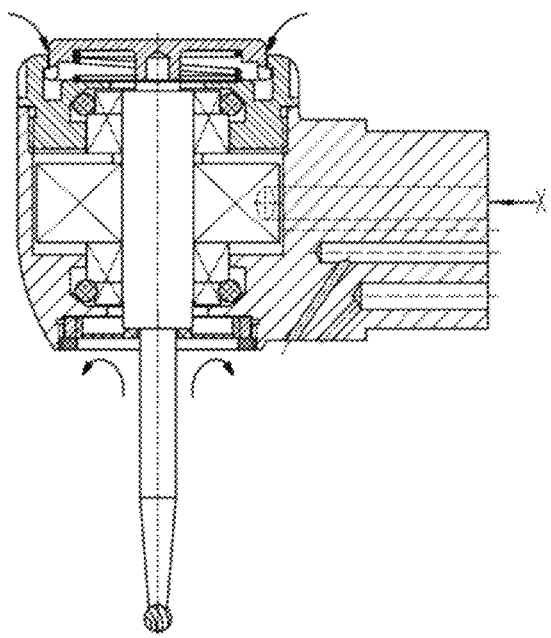
FIG. 4 is a state diagram in which suckback is prevented by the patent ZL 200610200741.X.
Figure 5:
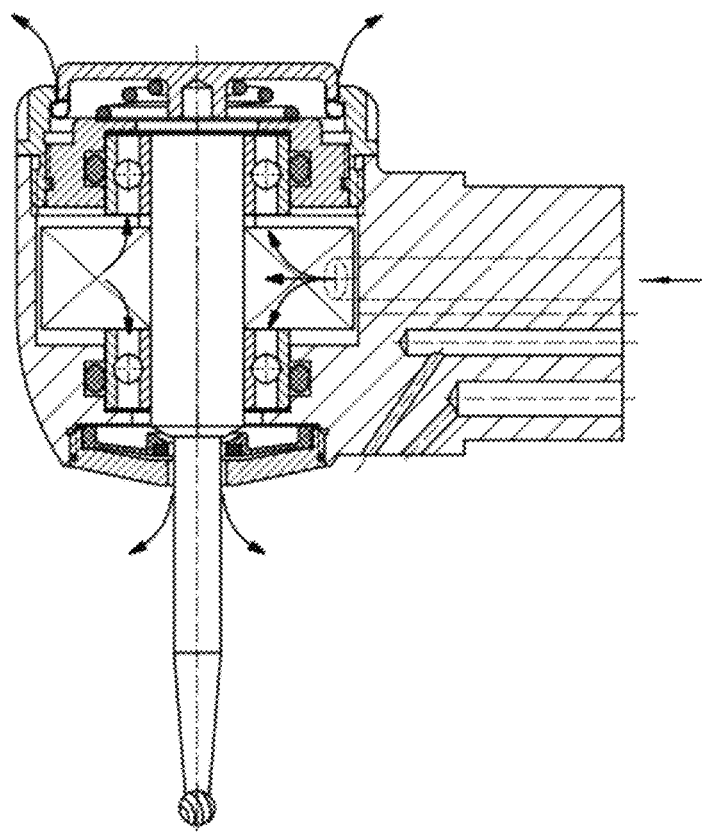
FIG. 5 is a drawing of the handpiece which is only equipped with the suckback prevention device on one side where a drill pin is installed.
Figure 6:
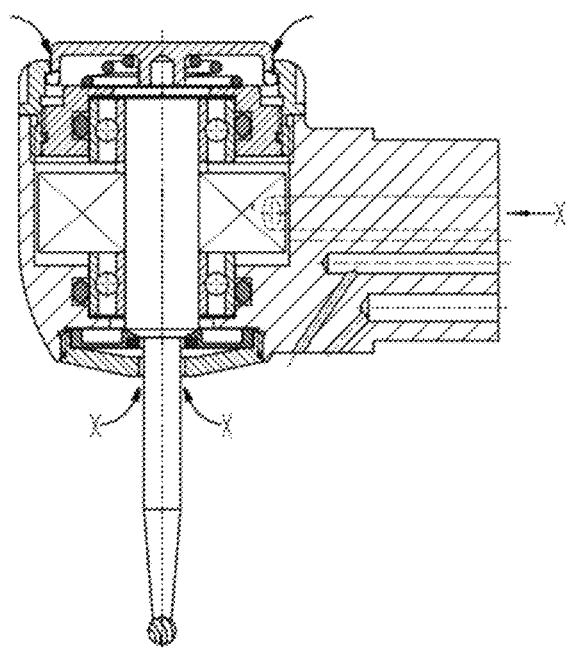
FIG. 6 is a negative pressure diagram of the handpiece which is equipped with the suckback prevention device only on one side when the handpiece stops rotating.
Figure 7:
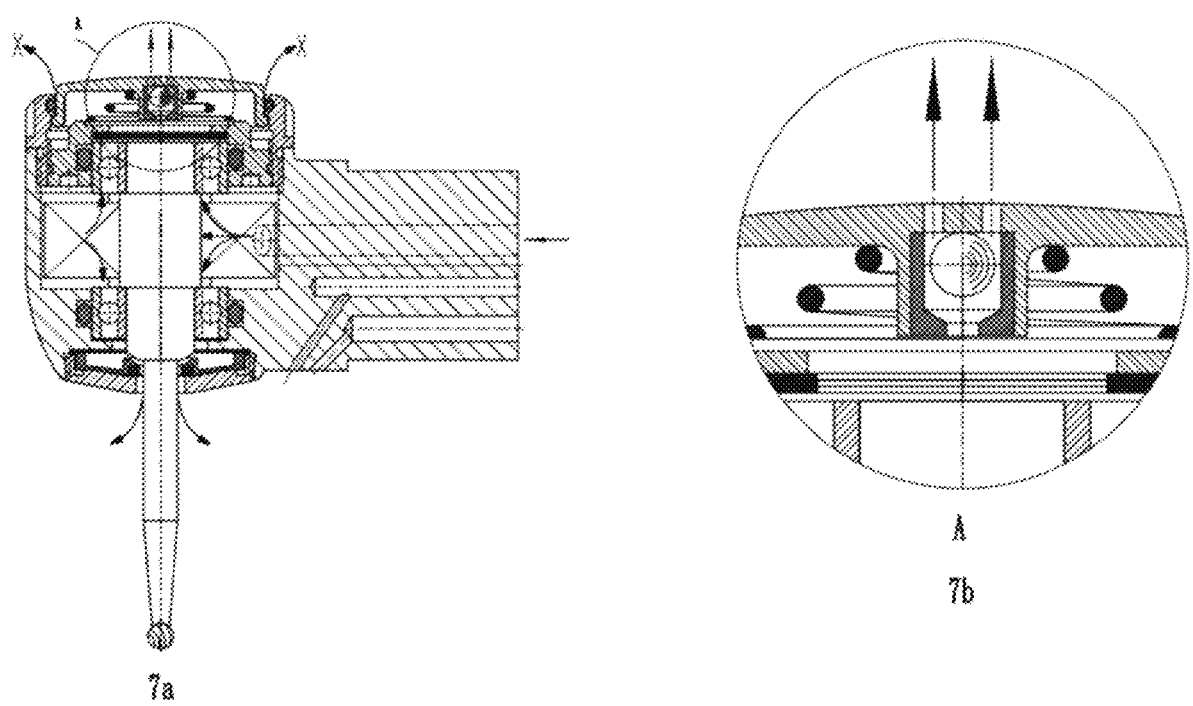
FIG. 7 is a working state diagram of the handpiece of the disclosure herein; 7a is an overall working state diagram.
Figure 8:
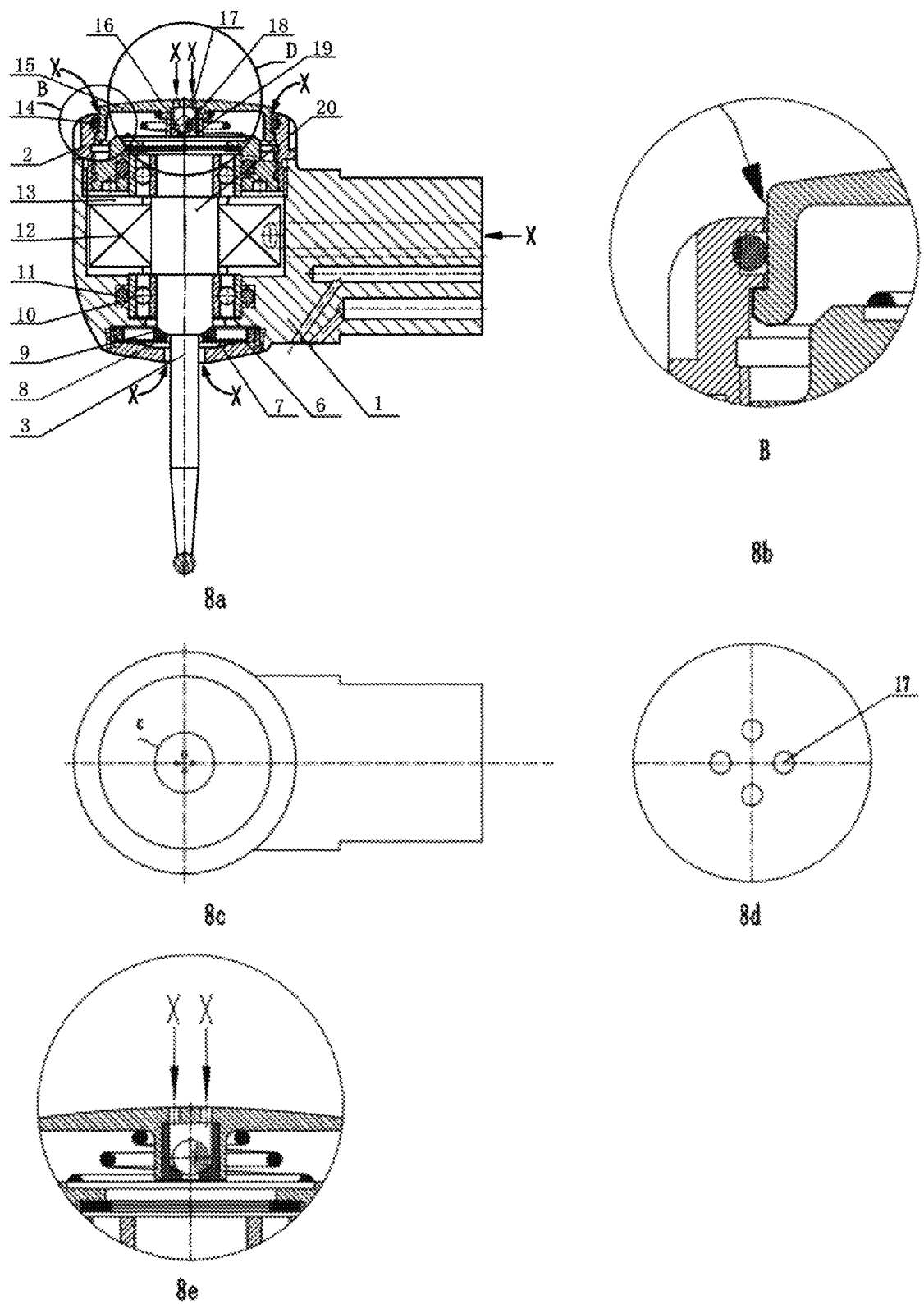
FIG. 8 is a state diagram of the handpiece of the disclosure herein when the wind wheel rotates by inertia after the air supply is stopped and generates a negative pressure without suckback.

Refer to FIG. 1 and FIG. 8. The zero-suckback device for a disposable high-speed turbine dental drill handpiece comprises or consists of a handpiece head 1, a head cover 2, a drill pin 3, a front handle 4 and a rear handle 5. The zero-suckback device of the disclosure herein is installed at two ends of the handpiece head 1.

1) On the side where the drill pin 3 is installed, the tapered end face 9 of the wind wheel shaft is manufactured to be conical and fits the lip portion of the elastic shaft sealing casing 7 which is internally embedded with the hard central framework 8, and the opposite face of the other side of the elastic shaft sealing casing 7 is equipped with a non-elastic shaft sealing casing 6 which is installed on the handpiece head 1, preventing the elastic shaft sealing casing 7 from transitional deformation during positive pressure blowing. Meanwhile, the hard central framework 8 in the center of the elastic shaft sealing casing 7 drives the central portion of the elastic shaft sealing casing 7 to move parallel to the central line of the wind wheel shaft 20 during blowing to prevent the narrowing of the compressed air passage during the deformation of the lip portion of the elastic shaft sealing casing 7, thus reducing the rotation speed and the output power losses. The lip portion (namely the center of the elastic shaft sealing casing close to the edge of the drill pin) of elastic shaft sealing casing 6 of the device presses against the tapered end face 9 of the wind wheel shaft by the joint effect of the elastic resetting of the elastic shaft sealing casing 6 and the negative pressure in the wind wheel chamber 13, so the wind wheel 12 brakes and seals up the tapered end face 9 of the wind wheel shaft, preventing the sucked substances from flowing into the wind wheel chamber 13.

2) On the side where the handpiece head 1 is equipped with the head cover, the following changes are made and present.

a) An O-shaped sealing ring 14 is installed between the button housing 15 and the head housing 2, and on the inner side of the head cover, the head housing 2 is formed with an annular slot for embedding the O-shaped sealing ring to prevent contaminants from entering the handpiece when the wind wheel chamber 13 is in negative pressure state.

b) A one-way valve with a valve ball 18 is installed in the center of the button housing 15 to play the following role: when the wind wheel 12 is rotating and the wind wheel chamber 13 is in positive pressure state, the one-way valve exhausts air for cooling a bearing 10 via vent holes 17. When the wind wheel 12 rotates by inertia after the air supply to the wind wheel 12 is stopped, the valve ball 18 is sucked to reset by the negative pressure in the wind wheel chamber 13, blocking the exhaust opening 16 of the valve body to prevent contaminants from entering the handpiece head 1.

The handpiece head 1 and the head cover are made of rubber plastic or metal materials.

The elastic shaft sealing casing 7 is a rubber or rubber plastic product.

The elastic shaft sealing casing 7 is internally embedded with the hard central framework 8 which is made of metal, hard rubber plastic or hard plastic materials.

The non-elastic shaft sealing casing 6 outside the elastic shaft sealing casing 7 is made of metal or hard plastics.

The O-shaped sealing ring 14 between the button housing 15 and the head housing 2 is a rubber or rubber plastic product.

The quantity of the vent holes 17 of the button housing 15 of the one-way valve is 2-8, preferably 4. The quantity and size of the vent hole are related to the designed exhaust area of the wind wheel.

The valve body 19 installed in the center of the button housing 15 is a metal or rubber plastic product, and the valve ball 18 in the center is a metal or rubber plastic product, preferably stainless steel ball which is hardened by quenching to increase the wear resistance.

Embodiment 2

Below is the use method of the high-speed turbine dental drill handpiece equipped with the zero-suckback device of the disclosure herein.

The use method and operation method of the disposable high-speed turbine dental drill handpiece equipped with the zero-suckback device of the disclosure herein are not different from those of other turbine dental drill handpieces.

1) Due to the O-shaped sealing ring 14 installed between the button housing 15 and the head housing 2, the button housing is slightly lowly raised when the doctor installs or removes the drill pin, but at last, can be completely raised to be reset. When the button housing is pressed down, the force applied is completely the same as the force applied to other handpieces, and users may feel gentle and have a better hand feel.
2) The handpiece equipped with the zero-suckback device can be quickly braked when the air supply is stopped, thus preventing the occurrence of suckback, and the doctor will feel more safer, convenient and reliable.
3) Due to almost zero sucked substance, contaminants are completely prevented from entering the handpiece head and the pipeline, thus effectively preventing cross infection.

Embodiment 3

Figure 9:
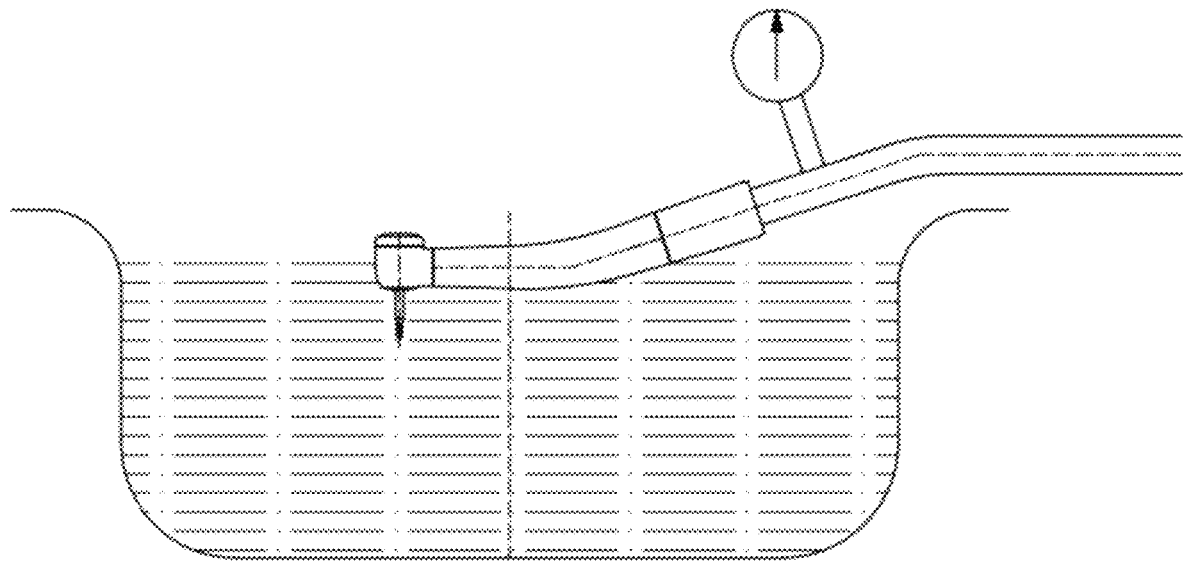
FIG. 9 is a diagram of the semi-immersion test of one side of the handpiece equipped with the drill pin (the arrow portion is the inlet air pressure indicator)
Figure 10:
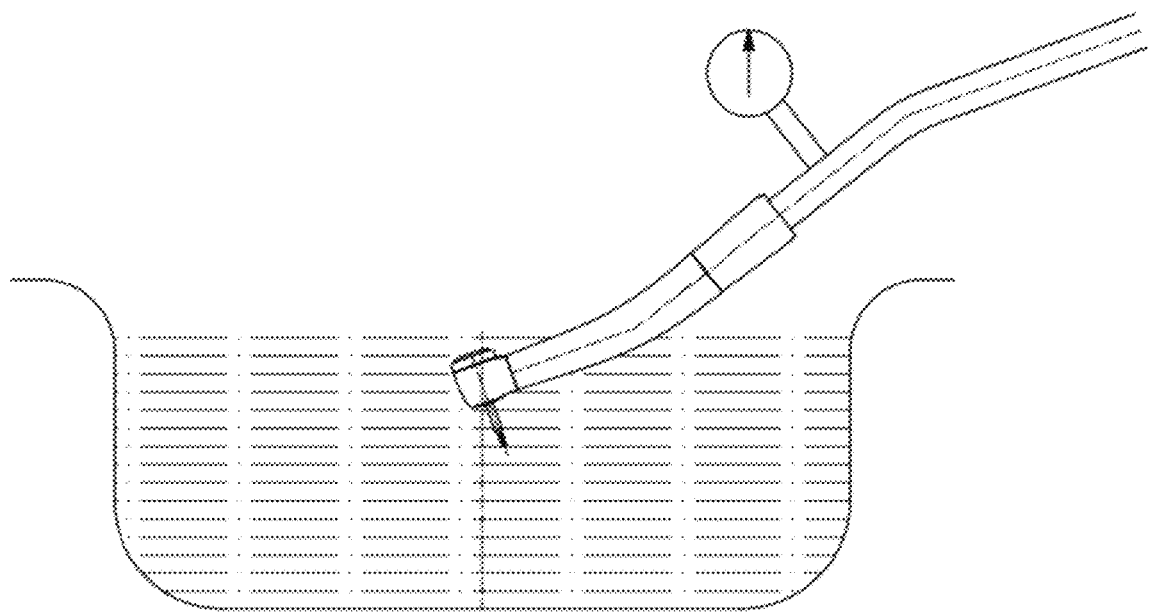
FIG. 10 is a diagram of the full water immersion test of the handpiece equipped with the drill pin (the arrow portion is the inlet air pressure indicator)

Instructions of the water immersion test of the handpiece can be seen in FIG. 9 and FIG. 10.

The water immersion test of the handpiece is a reliable and convenient method for testing the suckback prevention device of the handpiece.

1) Semi-immersion test: see FIG. 9. Take out the handpiece from the therapeutic connector, weigh the handpiece using a balance with a relatively high accuracy, record the weight of the handpiece at this time, re-install the handpiece in the therapeutic machine, close the water spray pipe, pedal the foot-switch to drive the handpiece to rotate normally, immerse the side of the handpiece where the handpiece is equipped with the drill pin into water in a water cup until the water level reaches the half of the handpiece head (the head cover may not be immersed in water), and stop the handpiece from rotating in water. After the handpiece stops, take the handpiece out of the water, remove the handpiece from the therapeutic machine, wipe off the water beads on the surface of the handpiece, and weigh it with the balance again. The weight added on the basis of the weight when the handpiece is not immersed is the suckback quantity of the handpiece after the handpiece is half immersed in water.
2) Full water immersion test: see FIG. 10.

Such test is identical with the semi-immersion test. But, the handpiece should be completely immersed in water after rotating and stops rotating in water. Then, take out the handpiece, weigh the handpiece, and compare the result with the weight of the handpiece before water immersion. The increase is the suckback quantity.

The handpiece of the disclosure herein can control the suckback quantity to zero or to a very tinny level in the full water immersion test or the semi-immersion test.

Therefore, such handpiece is called zero-suckback handpiece.

What is claimed is:

1. A handpiece head comprising a zero-suckback device for a disposable high-speed turbine dental drill handpiece, the zero-suckback device jointly comprising;
   a first suckback prevention device installed on a side of the handpiece head equipped with a drill pin; and
   a second suckback prevention device installed on a side of the handpiece head equipped with a head cover,
   wherein the head cover comprises a head housing and a button housing; a power wind wheel and a wind wheel shaft which drive the drill pin to rotate are disposed in a space formed by fastening the handpiece head and the head cover; the wind wheel shaft is supported by two bearings; O-shaped rubber damping rings are disposed between the bearings and the handpiece head; the wind wheel shaft is provided with the head cover at the upper end; a neck of the head is provided with a water duct, an air intake passage and an air exhaust passage; and an opening of the air intake passage is positioned at the power wind wheel;
   wherein the second suckback prevention device comprises an annular clamping slot disposed between the head housing and the button housing and positioned on an inner side of the head housing, the clamping slot internally embedded with an O-shaped sealing ring; and a one-way air exhaust mechanism provided in the button housing;
   wherein the O-shaped sealing ring and the one-way air exhaust mechanism together prevent contaminants from entering into the button housing;
   wherein the wind wheel shaft disposed in the handpiece head has one end connected to the drill pin while the end is a conical brake face, a lower end of the wind wheel shaft is retractably disposed in the handpiece head;
   wherein the first suckback prevention device comprises an elastic shaft sealing casing and a non-elastic shaft sealing casing on an end face connected to one side of the drill pin, the elastic shaft sealing casing is centrally formed with a drill pin hole with a size which is a little greater than a size of an outer diameter of the drill pin, an outer edge of the non-elastic shaft sealing casing is in connected with an outer edge of the handpiece head through screw threads, the non-elastic shift sealing cover is centrally formed with a drill pin hole with a size which is a little greater than the size of the outer diameter of the drill pin;
   wherein a thickness of the elastic shaft sealing casing close to a central portion is greater than a thickness of a ring-shaped portion between the central portion and the edge of the elastic shaft sealing casing, an inner surface of the central portion of the elastic shaft sealing casing is a tapered face matched with a brake surface of the wind wheel shaft; and
   wherein the elastic shaft sealing casing is disposed in the non-elastic shaft sealing casing, and a shape of the inner wall of the non-elastic shaft sealing casing is matched with the exterior shaft of the elastic shaft sealing casing in the inflated state.

2. The handpiece head according to claim 1, wherein the handpiece head and the head cover are made of metal or rubber plastic materials.

3. The handpiece head according to claim 1, wherein the elastic shaft sealing casing is made of rubber or rubber plastics.

4. The handpiece head according to claim 1, wherein the non-elastic shaft sealing casing is made of metal or hard plastic materials.

5. The handpiece head according to claim 1, wherein the O-shaped sealing ring between the head housing and the button housing is made of rubber, plastic or rubber plastic materials.

6. The handpiece head according to claim 1, wherein the one-way air exhaust mechanism is a one-way ball valve, comprising vent holes which are formed in a center of the button housing and a valve body which is disposed on the button housing, positioned in the dental drill handpiece and corresponds to the vent hole; the valve body contains a valve ball inside; and an exhaust opening is formed at the lower end of the valve body and communicates with an interior of the dental drill handpiece.

7. The handpiece head according to claim 6, wherein a quantity of the vent holes is 2-8.

8. The handpiece head according to claim 7, wherein the quantity of the vent holes is 4.

9. The handpiece head according to claim 6, wherein the valve body is a copper or stainless steel product.

10. The handpiece head according to claim 6, wherein the valve ball is a metal or rubber plastic product.

11. The handpiece head according to claim 1, wherein on one side of the non-elastic shaft sealing casing, the elastic shaft sealing casing is internally embedded with a hard central framework.

12. The handpiece head according to claim 11, wherein the outer diameter of the hard central framework is a little smaller than that of the central portion of the elastic shaft sealing casing, and the size of the inner diameter is a little greater than the size of the outer diameter of the drill pin.

13. The handpiece head according to claim 11, wherein the hard central framework is made of metals, hard rubber plastics or hard plastics.

14. The handpiece head according to claim 11, wherein the hard central framework is a metal ring.

\* \* \* \* \*